United States Patent [19]

Tipton

[11] Patent Number: 5,033,598

[45] Date of Patent: Jul. 23, 1991

[54] MECHANICAL/FLUID ACTUATED SLIDER CLUTCH

[76] Inventor: Kenneth L. Tipton, 1031 Fairlawn Dr., Rockledge, Fla. 32955

[21] Appl. No.: 532,748

[22] Filed: Jun. 4, 1990

[51] Int. Cl.⁵ ............................................ F16D 13/42
[52] U.S. Cl. .......................... 192/70.24; 192/105 C; 192/105 F; 192/83
[58] Field of Search ................ 192/70.24, 70.3, 70.23, 192/105 C, 105 F, 91 R, 83

[56] References Cited

U.S. PATENT DOCUMENTS

| | | | |
|---|---|---|---|
| 4,111,291 | 9/1978 | Horstman | 192/105 C |
| 4,732,251 | 3/1988 | Tipton | 192/70.26 X |
| 4,856,637 | 8/1989 | Gebhart | 192/105 C |
| 4,986,403 | 1/1991 | Tipton | 192/105 C X |
| 4,989,711 | 2/1991 | Schultz et al. | 192/105 F |

*Primary Examiner*—Allan D. Herrmann
*Assistant Examiner*—Andrea Pitts
*Attorney, Agent, or Firm*—Gordon K. Anderson

[57] ABSTRACT

An improved motorcycle slider clutch which utilizes several original equipment manufacturers components, also an aftermarket basket (34), housing gear assembly (44) and a pressure plate (74). The pressure plate engages the nest of discs (32) when compressed by a number of fingers (82) configured to create linear force when subjected to centrifugal action. An enclosure (100) surrounds the basket (34) and retains the fingers. This action defines the first or mechanical stage of operation. A number of counterbalanced fingers (120) are also rotatably contained in the enclosure (100) but are held from engagement with a restraining hub (142) connected to a fluid pressurized cylinder (136). The second, or pressurized fluid actuated stage, is engaged electrically in a timed sequence relieving the pressure allowing the counterbalanced fingers to exert pressure on the clutch discs and plates at the optimum moment.

15 Claims, 4 Drawing Sheets

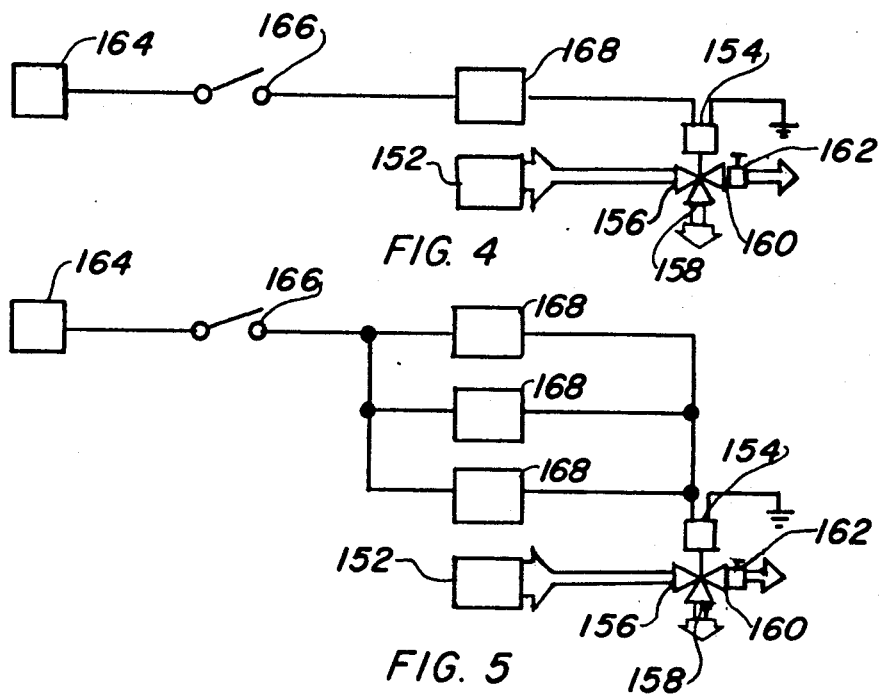
FIG. 4
FIG. 5
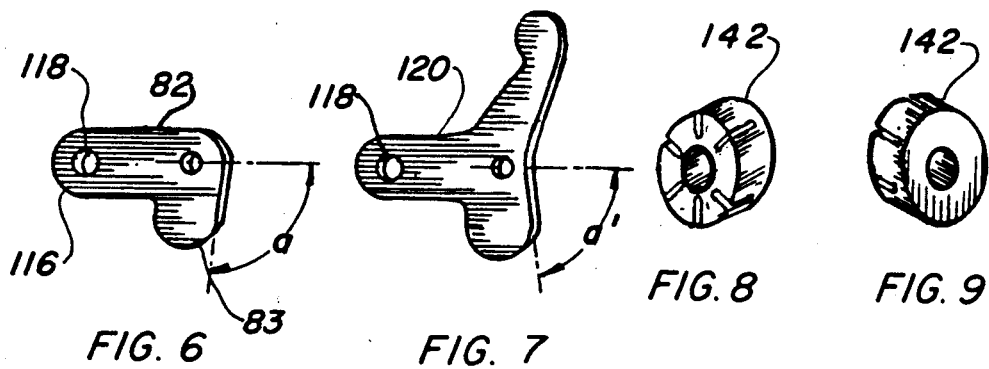
FIG. 6    FIG. 7    FIG. 8    FIG. 9
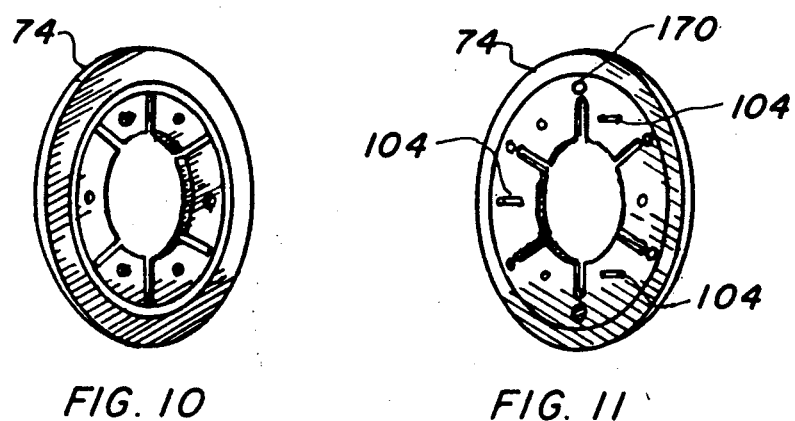
FIG. 10    FIG. 11

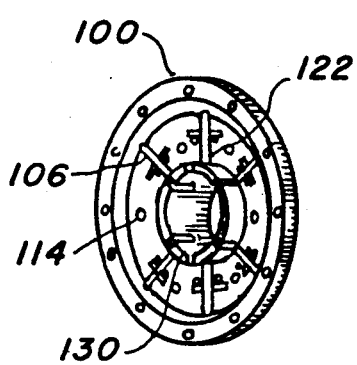  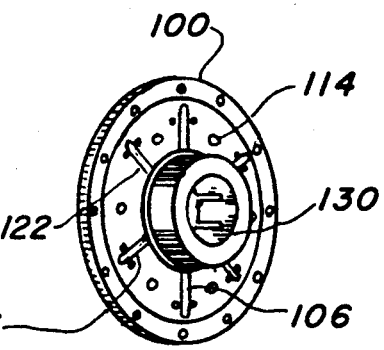
FIG. 14  FIG. 13  FIG. 12
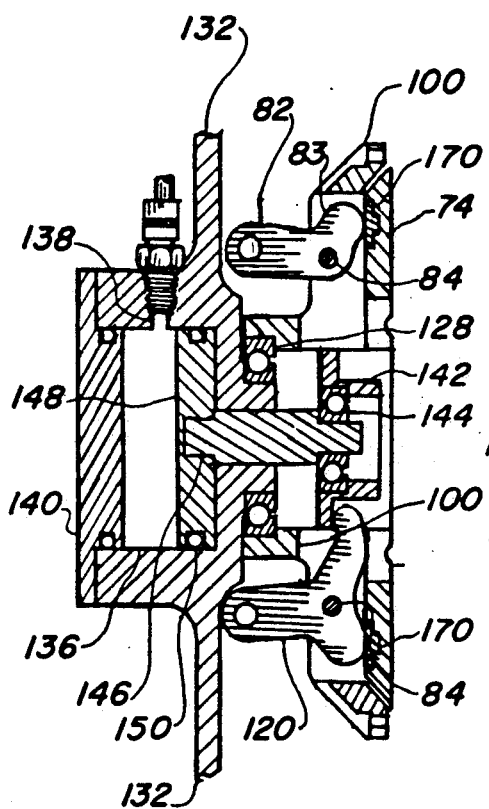 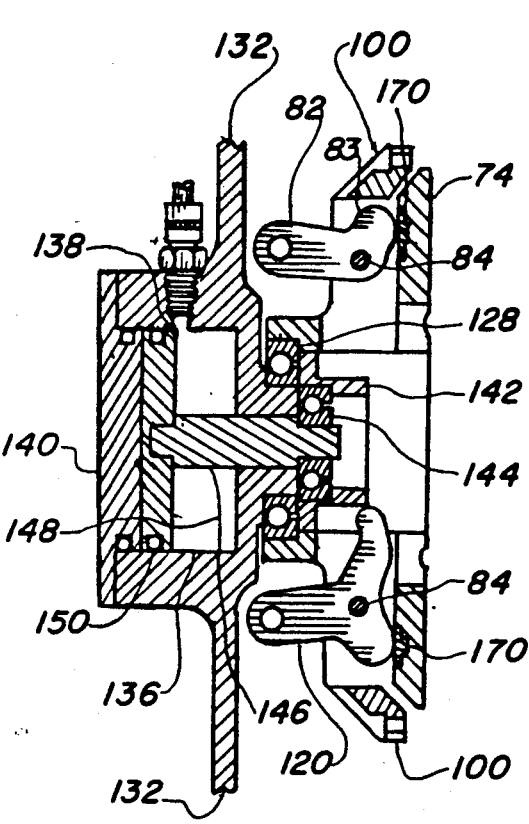
FIG. 15  FIG. 16

MECHANICAL/FLUID ACTUATED SLIDER CLUTCH

TECHNICAL FIELD

The present invention relates to racing motorcycle centrifugal clutches in general, and more specifically to combined mechanical and pressurized fluid actuated slider clutches operating in timed track racing environments.

BACKGROUND ART

Historically, in the sport of drag racing motorcycles, the use of a centrifugal clutch has predominated the field due to its superiority in regulated speed engagement and slip control. Developments to improve this type of clutch are continually being pursued many times based on improvements in already successful equipment. It has been well known that dry types of clutches have been tried in the past using materials with a high coefficient of friction for this purpose, however, the motorcycle must be extensively modified making the approach expensive and time consuming and, therefore, not very successful.

A search of the prior art did not disclose any patents that read directly on the claims of the instant invention, however, the inventors already issued U.S. Pat. No. 4,732,251 is part the art upon which the instant invention is based. The ability to employ existing components from the motorcycle manufacturer and the addition of a basket with a housing gear assembly and pressure plate was taught in this patent. This portion of the prior art is utilized as the antecedent and improvements are made from this base. This advancement was developed as the existing clutch could conceivably engage or lock-up prematurely, even though weights could be altered or preselected on the activating fingers theoretically precluding such an action.

Additionally, the inventor has filed a new application for another improvement, Ser. No. 07/488,212 filed Mar. 5, 1990, which also uses U.S. Pat. No. 4,732,251 as the foundation with the same existing components from the motorcycle and some of the inventors same components now widely accepted in the industry. The present invention, however, allows improvements to be made that creates unique control of the function of this modified slider clutch. Since the controls and structure are different and the outside slider plate is replaced and new elements have been added to control function, no anticipation or obviousness with this application or the parent patent exists.

DISCLOSURE OF THE INVENTION

Developments occur rapidly in the motorcycle racing field, particularly where drag racing is concerned, as the motorcycle original equipment manufacturers are highly competitive and change designs often and, likewise, the aftermarket equipment must be just as advanced and sophisticated, if not more so. The inventors prior U.S. Pat. No. 4,732,251 has, indeed, revolutionized the state of the art, however, while using this basic principle, there is still room for improvement.

It is, therefore, a primary object of the invention to employ the time tested mechanical stage of the inventors U.S. Pat. No. 4,732,251, modified to utilize only the basic components, with limitation, allowing the motorcycle to immediately leave the line without completely locking-up and overcoming the coefficient of friction between the tires and track unnecessarily spinning the wheels and then sequentially employ a secondary pressurized fluid actuated stage somewhat like the inventors application Ser. No. 07/488,212 to continue the torque transmission further "down the line". It will be noted that each system has proven effective in its own right, however, as races are won by inches, an ever-so-slight advantage may make the difference and to this end is the invention directed. Some drivers have found the inventors patented approach so successful that they are reluctant to change to a two-stage, due to its reliance on electric control. The present invention, therefore, provides the best of both worlds allowing the driver to mechanically launch the motorcycle with controlled engine torque while having available instantaneous second stage control through a pressurized fluid actuated system energized by onboard electrical power.

The use of this system does not allow a neutral or warm-up mode, however, its utility is expanded to employ multi-stage operation timed to coincide with shifting gears during the run. In the field of motorcycle racing there are classifications for the type of motorcycle fuel, displacement, etc., each requiring a different number of gears to be shifted, as an example, "Top Fuel" class usually employs 3 gears as the engine has the most horsepower. The so-called "Pro-comp." class, on the other hand, utilizes 4 gears customarily and the smaller engine "Prostock" classification normally uses 5 gears. The invention may be applied to any class, in the applicable configuration, and may be pre-programmed in the pits to energize and deenergize the fluid powered stage at the appropriate instant. This utility is accomplished using the appropriate number of millisecond timers sequentially adjusted to the optimum time interval for the specific motorcycle, driver and track conditions.

An important object of the invention is directed to the ability of complete adjustment during each stage of the operation. The mechanical stage may be adjusted by varying the weight on the offset finger which gives the motorcycle the initial propulsion for the starting sequence and the limitations are also controlled by the tension on the spring loaded fasteners maintaining a resistive bias on the pressure plate. The fluid stage is also further controlled by the addition of weight on the counterbalanced fingers altering the amount of pressure exerted by centrifugal force directly to the clutch friction discs and plates. Further, the bleed-down orifice in the solenoid valve is adjustable allowing the time duration from the initial release until fully engaged in a linear manner controlled by simple regulation of the orifice size.

Another object of the invention requires no change to be made in the motorcycle lubrication system as the entire clutch remains inside a new housing lubricated by the existing motorcycle system. It is well known that dry clutches create structural problems requiring considerable modification to the motorcycle structure, along with the addition of oil seals if the clutch is externally mounted.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 4 is a schematic diagram of the electrical portion of the fluid control system of the clutch in the preferred embodiment.

FIG. 5 is a schematic diagram of the electrical portion of the fluid control system for the clutch in the embodiment having a plurality of millisecond timers allowing independent sequential operation of the clutch during gear shifting.

FIG. 6 is a partial isometric view of one of the offset fingers completely removed from the invention for clarity.

FIG. 7 is a partial isometric view of one of the counter fingers completely removed from the invention for clarity.

FIG. 8 is a partial isometric view of the restraining hub viewed from the clutch side, completely removed from the invention for clarity.

FIG. 9 is a partial isometric view of the restraining hub viewed opposite the clutch side, completely removed from the invention for clarity.

FIG. 10 is a partial isometric view of the outside pressure plate viewed from the clutch side, completely removed from the invention for clarity.

FIG. 11 is a partial isometric view of the outside pressure plate viewed opposite the clutch side, completely removed from the invention for clarity.

FIG. 12 is a partial isometric view of the slider basket enclosure viewed from the clutch side, completely removed from the invention for clarity.

FIG. 13 is a side view of the slider basket enclosure completely removed from the invention for clarity.

FIG. 14 is a partial isometric view of the slider basket enclosure viewed opposite the clutch side, completely removed from the invention for clarity.

FIG. 15 is a cross-sectional view, as in FIG. 2, of the invention with the mechanical stage or first stage actuated.

FIG. 16 is a cross-sectional view, as in FIG. 2, of the invention with the mechanical and fluid actuating stage fully engaged allowing full force of all of the fingers to be applied to the pressure plate.

BEST MODE FOR CARRYING OUT THE INVENTION

Figure 1:
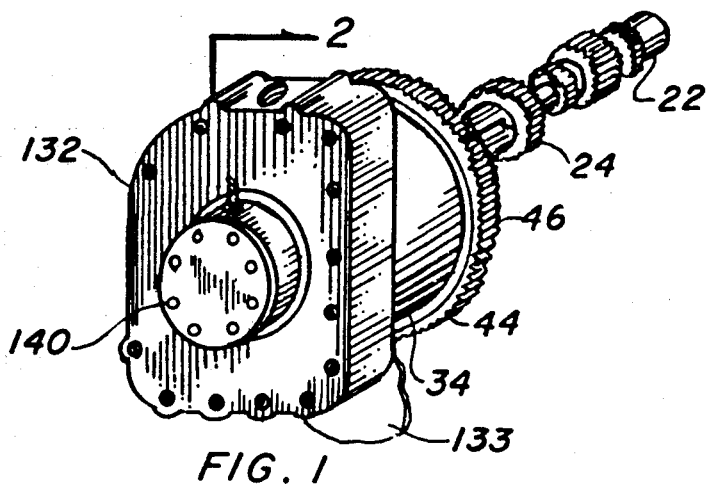
FIG. 1 is a partial isometric view of the preferred embodiment removed from the motorcycle less the peripheral equipment for actuating the pneumatic system.
Figure 2:
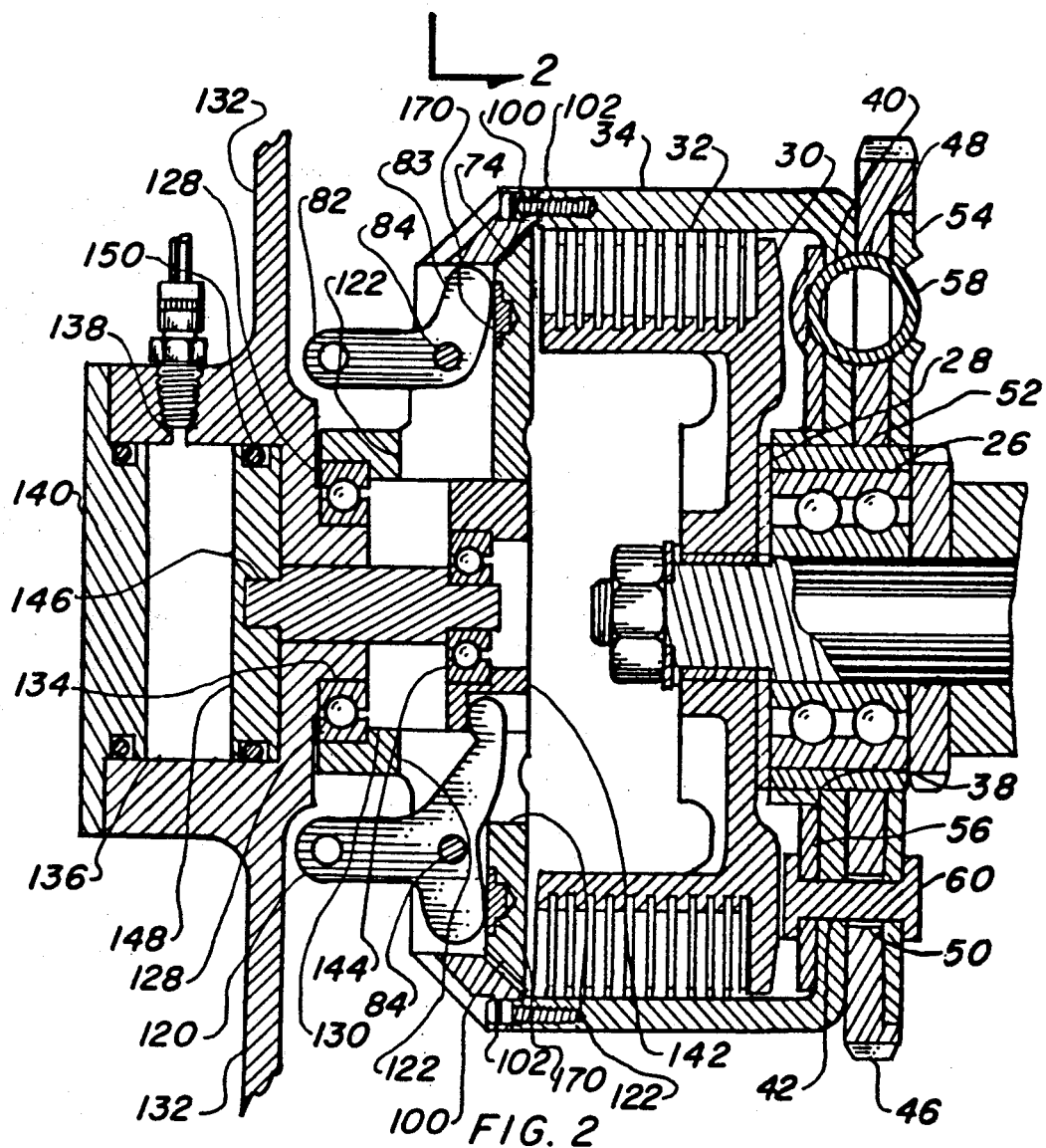
FIG. 2 is a cross-sectional view taken along lines 2—2 of FIG. 1 illustrating the interior of the clutch with the fluid system pressurized ready to be actuated and the mechanical system static or unengaged.
Figure 3:
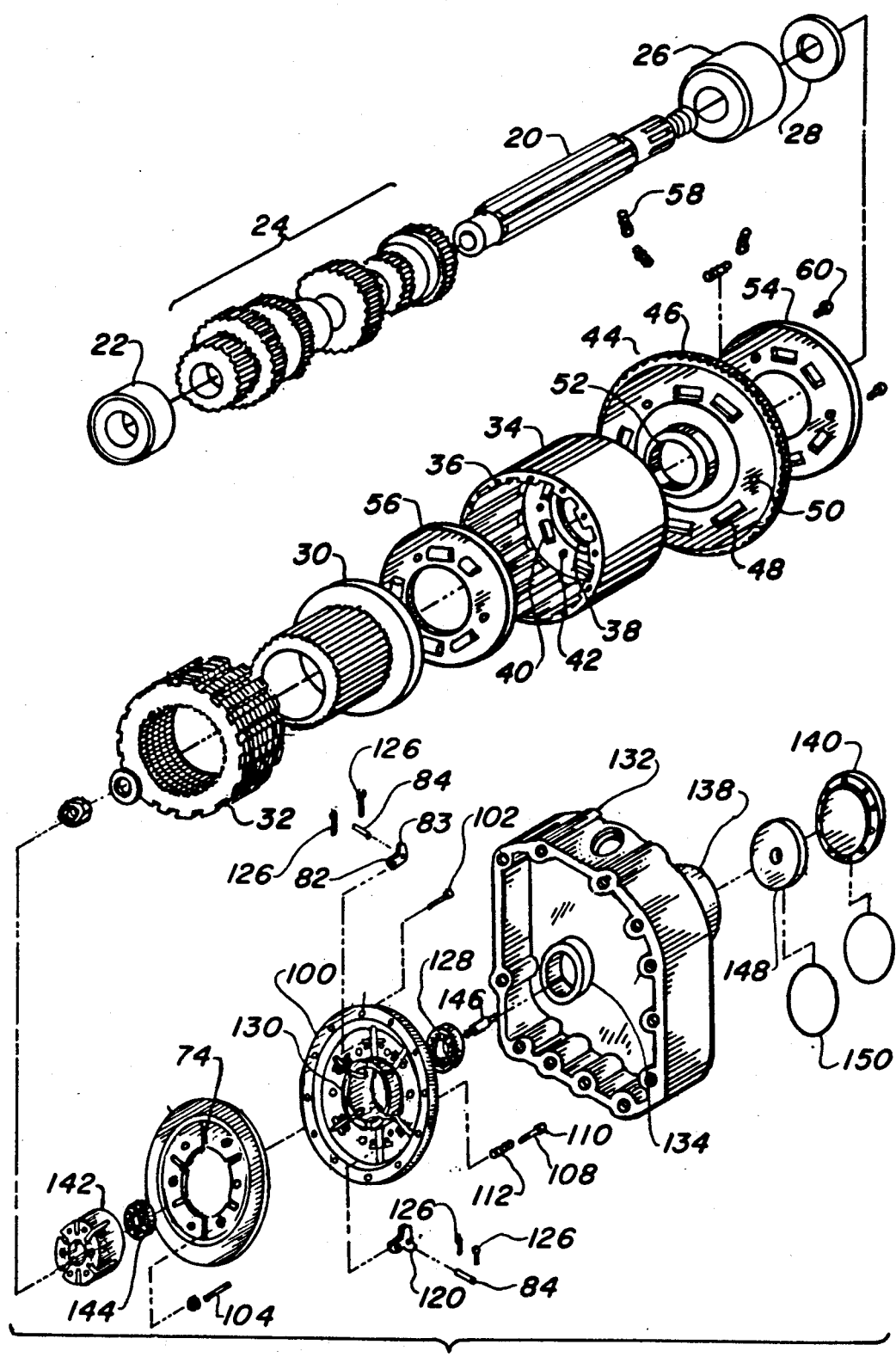
FIG. 3 is an exploded view of the slider clutch including all of the elements used from the original equipment manufacture, the inventors prior patent and inventors prior application along with the new elements for the combination.

The best mode for carrying out the invention is presented in terms of a preferred embodiment. The preferred embodiment, as shown in FIGS. 1 through 16 is comprised of a combination of original equipment manufacturer components, aftermarket components and new elements added to form the improvement. The motorcycle manufacturers parts are illustrated in FIGS. 1 through 3 and consist of a transmission output shaft 20, including a front bearing 22, the entire transmission gear cluster 24, with all necessary gears, jaws, bearings and springs, the main bearing assembly 26 including the thrust washer 28. The center hub 30 and a plurality of alternately nested clutch friction disks and clutch pressure plates 32. The above components are depicted best in the exploded view, FIG. 3, shown in light lines with no shading for differentiation with the others.

The elements used by the inventors previous U.S. Pat. No. 4,732,251 and now available as an aftermarket product, consist of a slider basket 34 with attaching holes 36, a bearing opening 38, a series of spring slots 40 and rivet holes 42. Also included is a spring loaded housing gear assembly 44 containing a housing gear 46, a number of retaining slots 48, clearance holes 50, and a bearing receiving opening 52 in the center thereof. Further, an outside backing plate 54 and inside backing plate 56 is included having springs 58 and rivets 60 therebetween, also an outside pressure plate 74 in movable contact with the friction discs urging the discs together during clutch actuation. A plurality of offset fingers 82 having a cam shaped radial extension 83 and held rotatably by a pin 84 are also utilized to exert pressure created by centrifugal to the pressure plate 74. For convenience, the element reference numbers 20–60, 74 and 82–84 are the same as the inventors previously described patent.

The new elements employed in the invention include some that were introduced in the inventors application Ser. No. 07/488,212, however, as many changes have been made some completely unique and others subtly altered the no cross-reference to specific elements will be given.

A slider basket enclosure 100 is joined to the slider basket 34 preferably with screws 102 allowing the enclosure to rotate with the basket. The configuration of the enclosure 100 envelopes and confines the pressure plate 74 allowing the pressure plate to move in a linear direction and be in contact with the clutch friction discs and plates 32 when receiving thrust from the fingers 82. The pressure plate 74 contains a number of studs 104 affixed thereunto that penetrate bores 106 in the enclosure 100 allowing the pressure plate 74 to be aligned and, yet, freely slide linearly back and forth relative to the discs and plates 32. Further, the pressure plate 74 contains at least a pair of spring loaded threaded fasteners 108 having a head 110 and a separate compression spring 112. Each fastener 108 penetrates a clearance hole 114 in the enclosure 100 and is attached to the pressure plate 74 with the threads. As the head 110 and spring 112 are on the outside of the enclosure, the pressure plate is held tightly against the enclosures inside surface under the influence of the springs. It will be noted that the studs 104 and fasteners 108 assure proper alignment of the pressure plate to the friction disc and plates 32 and allow linear movement. The springs 112 provide the resistance for the neutral position against the enclosure and may be changed in tension to alter the point of engagement.

The plurality of offset fingers 82 are pivotally attached to the slider basket enclosure 100 and are in an "L" shape with a cam shaped spadial extension 83, also an outwardly extending leg 116 with a pivot point in the middle. The extending leg 116 contains weight increasing means 118 in the form of a penetration through which a bolt and nut, or the like, may be added to increase the influence of centrifugal force. The shape of the spadial extension 83 may also be changed to alter the operational characteristic of the finger. The offset fingers 82 are employed in the first mechanical stage of operation and allow intimate contact between the pressure plate 74 and friction discs and plates 32 compressing them together, thereby joining the slider basket 34 with the center hub 30 furthering a union between the housing gear assembly 44 and the transmission gear cluster 24.

A plurality of counterbalanced fingers 120 are, likewise, pivotally attached to the slider basket enclosure 100 providing the same functional operation as the offset fingers 82, except are employed during the fluid pressure actuated second stage of operation. The fingers 120 are formed as a digit in an inverted tee shape with an upwardly extending arm capable of receiving weight the same as the penetration (weight receiving means 118) of the offset fingers 82. The fingers 120 also contain an inwardly extending arm that allows restraint and a cam arm that rotatably engages the pressure plate 74. As with its counterpart, offset finger 82, the finger 120 may be formed with a slight variation in configuration, such as a change in the angle "a" and "a'+, as shown in FIGS. 6 and 7, allowing a different amount of force to be exerted.

The basket enclosure 100 includes a number of cavities 122, one for each finger 82 and 120, and attaching means in the form of hardware including a pin 84 and threaded screws 126 allowing both containment of the fingers and radial movement permitting utilization of centrifugal force to actuate the clutch.

An enclosure bearing 128 is pressed on the outer race into a round stepped passage 130 in the basket enclosure 100 at a surface opposite and parallel with the interface of the basket 34 allowing the enclosure to be supported and rotate with the balance of the clutch.

A clutch housing case 132 is formed such that the outer shell interfaces with the motorcycle 133 and encloses the rotating clutch components. This case 132 is made liquid tight and allows the engine lubrication oil to be contained within the clutch cavity maintaining the so-called wet clutch feature of lubrication for the rotating components. The case 132 contains attachment means, such as machine screws, or the like, to join the housing to the motorcycle engine and maintain the integrity of the seal. The housing case 132, further, contains a projecting boss 134 on the side next to the engine that allows the enclosure bearing 128 to be contained on the inner race. This boss 134 and bearing 128 allow the basket 34 and enclosure 100 to be supported and revolve when rotated by the motorcycle engine. The other, or second, side of the housing case 132 contains an inwardly concave projecting portion defining a hollow cylinder 136 having a port 138 therein and a cap 140 removably attached over the hollow cylinder 136 forming a liquid tight chamber for use with pressurized fluids.

Restraining means are included in the invention and are contained within the basket enclosure 100 and housing case 132 suppressing the force created by the camming action of the counterbalanced fingers 120. This restriction allows unobstructed first mechanical stage of actuation to be accomplished by the offset fingers 82, as in the inventors patent '251. The energy of the counterbalanced fingers 120 is held in abeyance by restraining means that include a restraining hub 142, shown in FIGS. 2, 3 in the assembly, and, in FIGS. 8 and 9 completely removed. This hub 142 is hollow and contains a recessed register on one side that receives a throw-out bearing 144 with the outer race pressed therein. Further, the hub 142 contains a series of slots that correspond with the counterbalanced fingers 120 allowing clearance of each finger into the slot, however, the slot does not continue completely through the hub creating an obstructing shoulder that impeeds the complete movement of the finger 120. A restricting shaft 146 is pressed into the inner race of the bearing 144 and the other end penetrates the clutch housing case 132 into the hollow cylinder 136. A piston 148 is slideably positioned inside the hollow cylinder 136 and is connected, preferably by pressing an interference fit, onto the extending end of the shaft 146. The piston contains a seal 150 in the form of an 0-ring, or the like, on the periphery and causes the shaft and accompanying hub 142 to engage the fingers 120 when under the influence of the restraining means. This action holds back the force developed by the centrifugal action onto the fingers and retains it until the proper moment of release.

The force to operate the restraining means is supplied by integral pressurized fluid means allowing a gradual predetermined release of the constraints imposed by the above elements. When released, the counterbalanced fingers 120 urge the pressure plate 74 into further contact with the friction discs and plates 32 to complete the clutch final engagement cycle. The fluid actuating means include a source of pressurized fluid 152, such as pneumatic or hydraulic pressure well known in the art and easily adapted to the motorcycle and, hence, is not illustrated definitively in the drawings. Pneumatic pressure may be supplied using compressed air or gas in a pressure vessel or could be an electric driven pump, or the like, as any pressurized fluid source would work equally well. Likewise, any hydraulic power, such as the lubrication oil pressure on the motorcycle, may be used or a hand pump on a storage vessel with a myriad of other sources also available, as only a limited volume is required and a pressurized force sufficient to overcome the thrust of the fingers 120 is necessary.

A solenoid valve 154 is employed of the three-way type having 3 separate ports in pressure communication with two of the three ports at any given time. The first port 156 is attached to the fluid source 152 located on the motorcycle. The second port 158, on the valve 154, is attached to the chamber formed by the hollow cylinder 136 holding the restraining shaft 146 against the pressure plate 74 with the hub 142 preventing movement of the plate 74 in the mechanical or first stage of clutch operation as depicted in FIG. 15. The valve 154 further contains a third port 160 having a vented bleed down orifice 162 also well known in the art, such as a manual valve, fixed orifice or hole, or even a capillary tube.

The second and third port 158, 160 are in fluid contact when the solenoid valve 154 is electrically actuated. When this action takes place and the solenoid valve 154 is energized, the fluid pressure in the chamber formed by the hollow cylinder 136 is released according to the size of the orifice in a timed control manner, thereby allowing the fluid actuated or second stage of the clutch to operate, as previously described, with centrifugal force on the counterbalanced fingers 120 urging the friction discs and plates 32 into compression. The physical arrangement of this completed stage of operation is depicted pictorially in FIG. 16.

In order to electrically operate the solenoid valve 154, a direct current power source 164 is utilized that creates an electromagnetic field through a coil in which a plunger is located drawing the plunger into the coil by the magnetic field thus created. A control switch 166 is used to make or break the electrical current to the valve 154 allowing the fluid actuated stage to be energized.

Timing control means are employed to allow sufficient time to elapse from the instant the motorcycle is started and the switch 166 is thrown until the clutch is engaged in the mechanical or first stage allowing the motorcycle to initially start and accellerate before the fluid actuated or second stage is introduced. This control means preferably uses a millisecond timer 168 that allows an infinitely short duration of time to elapse until internal contacts close completing the electrical circuit. The timer 168 is adjustable allowing the optimum operation of the system taking into consideration the ambient variables encountered at the racing facility. The electrical circuit is illustrated schematically in FIG. 4. Alternatively, a number of timers 168 may be employed, as shown in FIG. 5, allowing sequential operation of the clutch during gear shifting procedures. The timing is adjusted to cycle the clutch at the precise time the gear is to be shifted allowing a smooth operation throughout the motorcycle shifting process.

The entire clutch with the exception of the fingers 82 and 120 and mounting hardware along with the pins 84, springs 58 and rivets 60 are preferably fabricated of aluminum, however, any material suitable for the purpose may be used with equal ease.

While unnecessary for functional operation of the clutch hardened steel wear pads 170 may be added to the pressure plate 74 where the fingers 82 and 120 interface, to prevent unnecessary wear and deforming of the material due to the constant stress and pressure exerted at the point of energy concentration.

In operation the motorcycle rider simultaneously increases engine speed and closes the control switch 166 which allows the offset fingers 82 to force the pressure plate 74 into contact with the friction discs and plates 32 starting the actual movement of the motorcycle. The switch 166 applies power to the millisecond timer 168 that allows the optimum time to lapse before energizing the solenoid valve 154. The valve changes the port relationship isolating the fluid pressure from the source 152 and allowing the pressure to be relieved through the vented bleed-down orifice 162. This action then permits the counterbalanced fingers 120 that were held in abeyance by the fluid pressure in the cylinder 136 holding the restraining hub 142 through the shaft 146 to be controllably released applying the force created by centrifugal action to the frictions discs and pressure plates 32. This procedure provides the first or mechanical stage to start the motorcycle initially and then at the precise moment the fluid actuated or second stage completes the procedure. Further, if desired, additional timers 168 may be used to step the shifting when the gears are changed.

FIG. 2 illustrates the clutch in the static position without the engine running. FIG. 15 depicts the mechanical stage actuated where FIG. 16 shows the second or fluid actuated stage energized.

While the invention has been described in complete detail and pictorially shown in the accompanying drawings, it is not to be limited to such details, since many changes and modifications may be made in the invention without departing from the spirit and the scope thereof. Hence, it is described to cover any and all modifications and forms which may come within the language and scope of the appended claims.

I claim:

1. An improved combined mechanical and fluid pressure actuated slider clutch for a motorcycle utilizing an original equipment manufacturers motorcycle transmission output shaft, front bearing, transmission gear cluster main bearing assembly, thrust washer, center hub and a plurality of nested clutch friction discs and plates, also an after-market slider basket, a spring loaded housing gear assembly having the main bearing assembly joined into the housing gear forming a rotational bearing receptacle and a pressure plate contiguous with the friction discs, urging the discs together during torque transmitting actuation, the improvement comprising:
   (a) a slider basket enclosure joined to the slider basket enveloping the pressure plate while allowing the pressure plate to move and be in contact with the friction discs and plates when urged thereupon;
   (b) a plurality of offset fingers pivotally attached to the slider basket enclosure allowing intimate contact with the pressure plate urgingly forcing the pressure plate into contact with the friction discs and plates to compress together unitedly joining the slider basket with the center hub making union between the spring loaded housing gear assembly and transmission gear cluster main gear assembly transmitting torque without completely locking-up providing a first mechanical stage of actuation;
   (c) a plurality of counterbalanced fingers pivotally attached to the slider basket enclosure providing the same functional operation as the offset fingers when allowed pivotal rotation permitting a fluid pressure actuated second stage of operation;
   (d) an enclosure bearing pressed into the basket enclosure on a surface opposite the interface with the slider basket and parallel thereunto;
   (e) a clutch housing case having a projecting boss on a first side and a second side defining a hollow cylinder, the boss pressed into the enclosure bearing allowing the slider basket and enclosure to be further supported and revolve freely when rotated externally;
   (f) restraining means contained within the basket enclosure and housing case suppressing the force created by a camming action of the counterbalanced fingers allowing unobstructed first mechanical stage of actuation to be accomplished by the offset fingers;
   (g) fluid pressure actuating means integral with the restraining means allowing a gradual predetermined release of constraints imposed by the restraining means permitting the counterbalanced fingers to urgingly force the pressure plate into further contact with the friction discs and plates such that torque on the output shaft does not overcome motorcycle coefficient of friction; and,
   (h) timing control means in communication with the fluid pressure actuating means providing predetermined timed sequential release of the restraining means.

2. The slider clutch as recited in claim 1 further comprising a plurality of studs affixed to said pressure plate, further said slider basket enclosure having a plurality of bores disposed therein with the studs slidingly interfacing into the bores defining a movable aligned union therebetween, also said pressure plate having at least a pair of spring loaded threaded fasteners attached thereto and said enclosure having mating threaded holes engagingly receiving the fasteners such that the plate is attracted to the flange under the influence of the springs until said fingers force the pressure plate into engagement with said friction discs and plates.

3. The slider clutch as recited in claim 1 further comprising said slider basket enclosure having a cavity for each finger and attaching means in the form of hardware including a pin and threaded screws allowing both containment of the fingers and radial movement for utilizing centrifugal force for actuating the clutch.

4. The slider clutch as recited in claim 1 wherein said offset fingers further comprise; a cam shaped spadial extension formed in an "L" shape with outwardly extending legs having a pivot point near the leg intersection and weight increasing means on the leg not in contact with the pressure plate.

5. The slider clutch as recited in claim 1 wherein said counterbalanced fingers further comprise; a digit in an inverted tee shape having an upwardly extending arm capable of receiving weight for increasing camming action therewith, an inwardly extending arm in communication with the restraining means and a cam arm contiguously engaging the pressure plate.

6. The slider clutch as recited in claim 1 wherein said clutch housing case further comprises;
   attachment means for joining the housing to the motorcycle, and
   said hollow cylinder having a port for communication with the fluid actuating means.

7. The slider clutch as recited in claim 1 wherein said clutch housing case further comprises; a cap removably affixed to the case over the hollow cylinder forming a fluid tight chamber therein.

8. The slider clutch as recited in claim 1 wherein the restraining means further comprise;
   a restraining hub slideably disposed slider basket enclosure,
   a throw-out bearing having an inner race and an outer race with the outer race pressed into the restraining hub, and
   a restraining shaft having a first end and a second end, the first end pressed into the throw-out bearing inner race and the second end penetrating the clutch housing case into the hollow cylinder, and
   a piston having a seal slideably positioned within the case hollow cylinder and pressed onto the second end of restraining shaft allowing the hub to engage the counterbalanced fingers when under the influence of the restraining means holding the fingers from exerting the force developed by centrifugal action of the rotating clutch until the fluid pressure actuating means providing the gradual release of the constraints.

9. The slider clutch as recited in claim 8 wherein the fluid control means further comprise;
   a fluid power source supplying pressurized fluid for energizing pressure actuated controls,
   a solenoid valve in communication with the fluid power source, the solenoid valve having a first port, a second port, and a third port, the first port connected to the fluid power source, the second port fluidly joined to the clutch housing case hollow cylinder and the third port having a vented bleed-down orifice, the valve allowing the pressurized fluid from the source to force the piston with its accompanying restraining shaft and hub against the counterbalanced fingers preventing the fingers from urging the pressure plate into further compression of the friction discs and plates, also when the third port is opened the fluid pressure is relieved through the orifice in a time controlled manner gradually allowing the force of the fingers to actuate the clutch in a second fluid pressure actuated stage of operation,
   a direct current electrical power source interruptably connected to said solenoid valve, and
   a control switch for energizing the electrical power to the solenoid valve.

10. The slider clutch as recited in claim 9 wherein said timing control means further comprise; at least one millisecond timer electrically joined to said switch and said solenoid valve such that when the switch is made at the time the motorcycle is started, the solenoid valve is actuated through the timer allowing an infinitely short duration of time to elapse before the solenoid is energized providing both a mechanical then fluid actuated step control sequence in the clutch engaging procedure.

11. The slider clutch as recited in claim 10 further comprising; the fluid power source is pneumatic pressure.

12. The slider clutch as recited in claim 10 further comprising; the fluid power source is hydraulic pressure.

13. The slider clutch as recited in claim 10 further comprising; a plurality of millisecond timers allowing independent sequential operation of the clutch during gear shifting operation.

14. The slider clutch as recited in claim 1 wherein said offset fingers and counterbalanced fingers further comprise; a variation in configuration allowing a predetermined amount of force to be exerted against the pressure plate according to the motorcycle output shaft speed providing infinite adjustment to control the force to the friction discs and plates by the fingers.

15. The slider clutch as recited in claim 1 further comprising; aluminum as a base material for an entire clutch, except for the fingers.

* * * * *